United States Patent
Trefler

(10) Patent No.: US 7,640,222 B2
(45) Date of Patent: Dec. 29, 2009

(54) RULES BASE SYSTEMS AND METHODS WITH CIRCUMSTANCE TRANSLATION

(75) Inventor: Alan Trefler, Brookline, MA (US)

(73) Assignee: Pegasystems Inc., Cambridge, MA (US)

( * ) Notice: Subject to any disclaimer, the term of this patent is extended or adjusted under 35 U.S.C. 154(b) by 192 days.

(21) Appl. No.: 11/368,360

(22) Filed: Mar. 3, 2006

(65) Prior Publication Data

US 2007/0239646 A1    Oct. 11, 2007

(51) Int. Cl.
*G06N 5/02*    (2006.01)

(52) U.S. Cl. ............................ 706/47; 706/45; 706/46; 706/48; 703/3

(58) Field of Classification Search ............. 706/45–48; 707/3–6; 700/103, 104
See application file for complete search history.

(56) References Cited

U.S. PATENT DOCUMENTS

| | | | |
|---|---|---|---|
| 4,344,142 A | | 8/1982 | Diehr, II et al. |
| 4,866,634 A | | 9/1989 | Reboh et al. |
| 5,136,523 A | * | 8/1992 | Landers ..................... 706/50 |
| 5,193,056 A | | 3/1993 | Boes |
| 5,204,939 A | * | 4/1993 | Yamazaki et al. ............. 706/50 |
| 5,386,559 A | | 1/1995 | Eisenberg et al. |
| 5,504,879 A | | 4/1996 | Eisenberg et al. |
| 5,815,415 A | | 9/1998 | Bentley et al. |
| 5,819,257 A | | 10/1998 | Monge et al. |
| 5,826,239 A | | 10/1998 | Du et al. |
| 5,826,250 A | * | 10/1998 | Trefler ....................... 706/50 |
| 5,875,334 A | | 2/1999 | Chow et al. |
| 5,890,146 A | | 3/1999 | Wavish et al. |
| 5,890,166 A | | 3/1999 | Eisenberg et al. |
| 5,930,795 A | | 7/1999 | Chen et al. |
| 5,995,948 A | | 11/1999 | Whitford et al. |

(Continued)

FOREIGN PATENT DOCUMENTS

EP    1830312    9/2007

(Continued)

OTHER PUBLICATIONS

Euproean Search Report, Application No. 07250844.3, Issued Jul. 11, 2007.

(Continued)

*Primary Examiner*—David R Vincent
*Assistant Examiner*—Omar F Fernandez Rivas
(74) *Attorney, Agent, or Firm*—Nutter McClennen & Fish LLP; David J. Powsner

(57) ABSTRACT

The invention provides, in one aspect, a method of finding a rule in a rules base that includes a plurality of rule entries, each having a rule and an associated objective and one or more associated circumstances. A rule finder accesses the rules base in response to a request, with a specified objective and with specified circumstances, by searching the rules base for a matching entry. Where the search fails, the rule finder searches one or more translation tables for entries having first circumstances matching those specified in the request that resulted in the failure. If found, the rule finder repeats the search of the rules base with the specified objective and with a second (or "map-to") circumstances from matching entries in the translation tables. The rule finder can return, e.g., to an application program that issued the request, a rule found during that repeat search of the rules base.

23 Claims, 7 Drawing Sheets

U.S. PATENT DOCUMENTS

| | | | |
|---|---|---|---|
| 6,023,704 | A | 2/2000 | Gerard et al. |
| 6,085,198 | A | 7/2000 | Skinner et al. |
| 6,105,035 | A | 8/2000 | Monge et al. |
| 6,192,371 | B1 | 2/2001 | Schultz |
| 6,338,074 | B1 | 1/2002 | Poindexter et al. |
| 6,341,293 | B1 | 1/2002 | Hennessey |
| 6,359,633 | B1 | 3/2002 | Balasubramaniam et al. |
| 6,448,964 | B1 | 9/2002 | Isaacs et al. |
| 6,493,754 | B1 | 12/2002 | Rosborough et al. |
| 6,496,812 | B1 | 12/2002 | Campaigne et al. |
| 6,502,239 | B2 | 12/2002 | Zgarba et al. |
| 6,513,018 | B1 | 1/2003 | Culhane |
| 6,526,440 | B1 | 2/2003 | Bharat |
| 6,526,457 | B1 | 2/2003 | Birze |
| 6,549,904 | B1 | 4/2003 | Ortega et al. |
| 6,556,985 | B1 | 4/2003 | Karch |
| 6,567,419 | B1 | 5/2003 | Yarlagadda |
| 6,584,464 | B1 | 6/2003 | Warthen |
| 6,629,138 | B1 | 9/2003 | Lambert et al. |
| 6,636,850 | B2 | 10/2003 | Lepien |
| 6,636,901 | B2 | 10/2003 | Sudhakaran et al. |
| 6,661,908 | B1 | 12/2003 | Suchard et al. |
| 6,678,882 | B1 | 1/2004 | Hurley et al. |
| 6,684,261 | B1 | 1/2004 | Orton et al. |
| 6,728,702 | B1 | 4/2004 | Subramaniam et al. |
| 6,728,852 | B1 | 4/2004 | Stoutamire |
| 6,748,422 | B2 | 6/2004 | Morin et al. |
| 6,750,858 | B1 | 6/2004 | Rosenstein |
| 6,756,994 | B1 | 6/2004 | Tlaskal et al. |
| 6,772,350 | B1 | 8/2004 | Belani et al. |
| 6,782,091 | B1 | 8/2004 | Dunning, III |
| 6,829,655 | B1 | 12/2004 | Huang et al. |
| 6,831,668 | B2 | 12/2004 | Cras et al. |
| 6,839,682 | B1 | 1/2005 | Blume et al. |
| 6,847,982 | B2 | 1/2005 | Parker et al. |
| 6,851,089 | B1 | 2/2005 | Erickson et al. |
| 6,856,575 | B2 | 2/2005 | Jones et al. |
| 6,859,787 | B2 | 2/2005 | Fisher et al. |
| 6,865,546 | B1 | 3/2005 | Song |
| 6,867,789 | B1 | 3/2005 | Allen et al. |
| 6,959,432 | B2 | 10/2005 | Crocker et al. |
| 6,961,725 | B2 * | 11/2005 | Yuan et al. ............... 707/4 |
| 6,976,144 | B1 | 12/2005 | Trefler et al. |
| 6,985,912 | B2 | 1/2006 | Mullins et al. |
| 7,020,869 | B2 | 3/2006 | Abrari et al. |
| 2001/0049682 | A1 | 12/2001 | Vincent et al. |
| 2002/0091677 | A1 | 7/2002 | Sridhar |
| 2004/0049509 | A1 | 3/2004 | Keller et al. |
| 2004/0088199 | A1 * | 5/2004 | Childress et al. ............... 705/4 |
| 2004/0162822 | A1 * | 8/2004 | Papanyan et al. ............... 707/4 |
| 2005/0039191 | A1 | 2/2005 | Hewson et al. |
| 2005/0165823 | A1 | 7/2005 | Ondrusek et al. |
| 2005/0234882 | A1 | 10/2005 | Bennett et al. |
| 2006/0041861 | A1 | 2/2006 | Trefler et al. |
| 2006/0173724 | A1 | 8/2006 | Trefler et al. |
| 2006/0218166 | A1 | 9/2006 | Myers et al. |
| 2007/0028225 | A1 | 2/2007 | Whittaker et al. |
| 2007/0233902 | A1 | 10/2007 | Trefler et al. |
| 2007/0239646 | A1 | 10/2007 | Trefler |

FOREIGN PATENT DOCUMENTS

| | | |
|---|---|---|
| EP | 1840803 | 10/2007 |
| WO | WO-0179994 | 10/2001 |
| WO | WO-0244947 | 6/2002 |
| WO | WO-2005010645 | 2/2005 |
| WO | WO-2005/117549 | 12/2005 |
| WO | WO-2005117549 | 12/2005 |

OTHER PUBLICATIONS

Anonymous "How SmartForms for Fair Blaze Advisor works", Fair Issac White Paper.

Busse, Ralph et al., "Declarative and Procedural Object Oriented Views", 1998, IEEE.

Cochrane, Roberta et al, "Integrating Triggers and Declarative Constraints in SQL", p. 567-578, Proceedings of the 22nd VLDB Conference Mumbai (Bombay), India, 1996.

Francisco, S. et al "Rule-Based Web Page Generation" Proceedings of the 2nd Workshop on Adaptive Hypertext and Hypermedia, Hypertext'98, Jun. 24, 1998.

Kuhn, H.W. "The Hungarian Method For The Assignment Problem," Naval Research Logistics Quarterly, 2 (1955), pp. 83-97.

Manghi, Paolo et. al. "Hybrid Applications Over XML: Integrating The Procedural And Declarative Approaches", 2002 ACM.

Mecca, G. et al. "Cut and Paste", ACM, 1999.

Schiefelbein, Mark A Backbase Ajax Front-end for J2EE Applications, Internet Article, Aug. 29, 2005.

* cited by examiner

RULES BASE SYSTEMS AND METHODS WITH CIRCUMSTANCE TRANSLATION

BACKGROUND OF THE INVENTION

The invention relates to digital data processing and, more particularly, to rules base systems and methods.

Computer systems that facilitate business operations based on information specific to an industry or enterprise are well known in the art. These typically rely on rules identifying situations that are expected to arise during enterprise operation and applicable responses. Such systems have been used in a range of applications, from health care to automotive repair. The rules on which they rely come from experts in the field, from the collective experience of workers on the "front line," or a combination of these and other sources.

Simple computer systems of this sort incorporate application-specific knowledge directly into source code, using (for example) a sequence of "if . . . then . . . else" or "case" statements. From these, the executing systems can identify appropriate responses to conditions input, e.g., by a human operator, by automated monitoring equipment, and so forth. For example, a simple banking system for determining and displaying loan rates based on customer locale, customer type, and order size might encode such information as follows:

If (city=Boston) and (state=MA) and (customer=Platinum), then display 8.1%,
Elseif (city=Boston) and (state=MA) then display 8.3%,
Elseif (city=Providence) and (state=RI), then display 8%,
Elseif (city=NewYork) and (state=NY), then display 8.5%,
Elseif (city=Washington) and (state=DC) and (products ordered>3), then display 8.0%,
Elseif (city=Washington) and (state=DC) and (products ordered<=3), then display 8.1%,
Elseif (city=Sacramento) and (state=CA), then display 7.5%,
Elseif (city=San Francisco) and (state=CA), then display 6.6%.

One drawback of this approach is that encoding knowledge in programming constructs themselves can make implementation difficult in all but the most limited applications. A further drawback is that the complexity and operational inefficiencies of these systems grow rapidly as their sizes increase.

More complex systems store knowledge separately from the programs that access them. Many of these use "rules bases" that store application-specific information in tables, database records, database objects, and so forth. For example, such a system might store the information above in a table as follows:

| City | State | Customer Type | # Prod | Rate |
|------|-------|---------------|--------|------|
| Boston | MA | Platinum | | 8.1% |
| Boston | MA | Not Platinum | | 8.3 |
| Providence | RI | | | 8.0% |
| New York | NY | | | 8.5% |
| Washington | DC | | <3 | 8.1% |
| Washington | DC | | >3 | 8.0 |
| Sacramento | CA | | | 7.5% |
| San Francisco | CA | | | 6.6% |

Traditionally, such tables (and, more broadly, such rules bases) are dedicated to a single class of problems. For example, a bank might use one rules base for determining loan rates and another for determining credit worthiness. More comprehensive systems combine rules covering diverse situations into a single knowledge or rules base, indexing those solutions by two or more values, e.g., "objective" and "circumstance" (or "objective," "circumstance 1," "circumstance 2," and so forth). The objective identifies the class of problems, e.g., loan rates, credit worthiness, etc. The circumstances identify the particular situation of interest, e.g., customer locale, customer type, and/or order size (for the objective "loan rate"), savings balance level (for the objective "credit worthiness"), etc.

Such a rules base is disclosed in commonly assigned U.S. Pat. No. 5,826,250, entitled "Rules Bases and Methods of Access Thereof." According to the abstract of that patent, each entry of a rules base has an associated objective and circumstance, as well as a status. The latter has values such as "valid" (indicating that information for that entry corresponds to a rule for the corresponding objective/circumstance), "inheritance" (indicating that the rule for the corresponding objective/circumstance is available, e.g., in another entry in the rules base), and so forth. Methods for using that rules base make use of these status designators, along with an inheritance structure that is maintained with the rules base, to find rules matching a designated objective and circumstance.

While rules bases of the type described in the foregoing patent and utilized in products of the assignee have met with great acceptance, there remains room for improvement.

An object of this invention is to provide improved systems and methods for digital data processing. A more particular object is to provide improved rules bases, as well as systems and methods that use them.

A further object is to provide such systems and methods as utilize rules bases that can be readily populated and searched.

A related object of the invention is to provide such systems and methods as utilize rules bases that store information without excessive redundancy and that can be easily modified.

Still another object of the invention is to provide such systems and methods as can be implemented on legacy, current and future digital data processing systems, and that operate without undue consumption of computer storage and processing resources.

SUMMARY OF THE INVENTION

The invention provides, in one aspect, a method of finding a rule in a rules base that includes a plurality of rule entries, each having a rule, an associated objective and one or more associated circumstances. A rule finder accesses the rules base in response to a request, with a specified objective and specified circumstance(s), by searching the rules base for a matching entry. Where the search fails, the rule finder searches one or more corresponding translation tables for an entry having a first circumstance matching the specified circumstance. If found, the rule finder repeats the search of the rules base with the specified objective and with a second (or "map-to") circumstance from the matching entry in the translation table(s). The rule finder can return, e.g., to an application program that issued the request, a rule found during that repeat search of the rules base.

Further aspects of the invention provide methods as described above in which the translation tables have one or more entries that include, in lieu of a map-to circumstance, an identifier of a still further translation table. According to these aspects, the rule finder responds to a successful search of a first translation table by searching a second table for a translation entry matching the specified circumstance. If found, a map-to circumstance associated with that entry is used by the rule finder during repeat the search of the rules base.

Still further aspects of the invention provide methods as describe above in which a first translation table includes some entries containing a first circumstance and an identifier of a further translation table, and other entries containing a first circumstance and a second (or map-to) circumstance. According to these aspects, the rule finder responds to a successful search of the first translation table matching an entry of the former type by searching the second translation table and using the results of that search for the repeat search of the rules base. On the other hand, where the search of the first translation table is successful in finding an entry of the latter type, the rule finder repeats the search of the rules base with the map-to circumstance from the matching entry of the first translation table.

These and other aspects of the invention are evident in the drawings and the description that follows.

BRIEF DESCRIPTION OF THE DRAWINGS

The foregoing features, objects and advantages of the invention will become apparent to those skilled in the art from the following description and the accompanying drawings.

DETAILED DESCRIPTION

Structure

Figure 1:
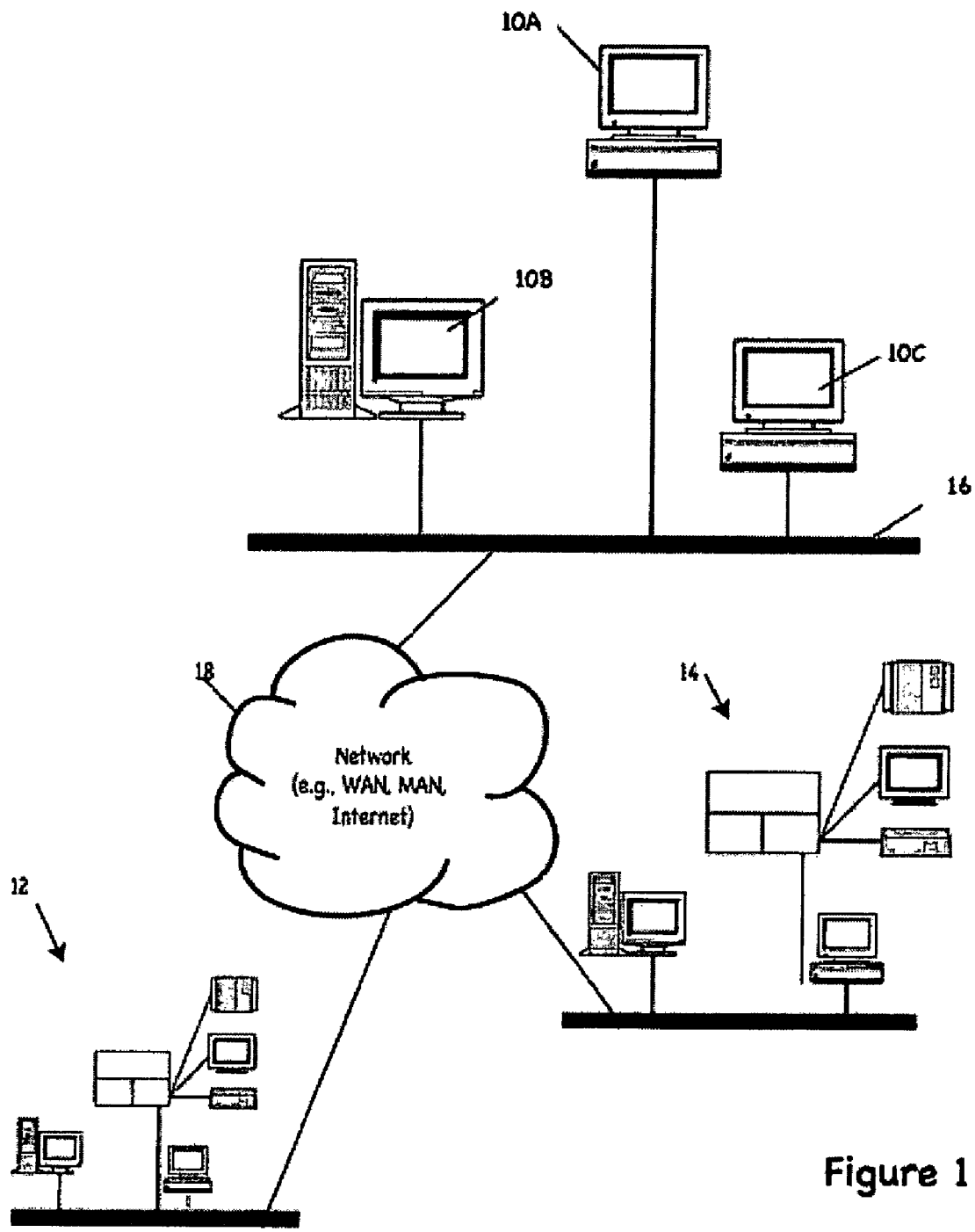
FIG. 1 depicts a digital data processing environment of the type in which the invention may be practiced.

FIG. 1 depicts a digital data processing environment of the type in which the invention may be practiced. This includes digital data processors 10a-10C, along with digital data processing systems 12, 14, all coupled, by way of example, via a local area network (LAN) 16, wide area network (WAN), metropolitan area network (MAN), Internet and/or other networks or communications media (collectively, identified by elements 16 and 18 in the drawing). Digital data processors 10A-10C, as well as systems 12, 14, comprise personal computers, work stations, mainframes, embedded processors and/or other digital data processing apparatus of the type known in the art, one or more of which can be adapted for operation in accord with the teachings hereof. While the environment depicted in FIG. 1 mirrors a conventional corporate or enterprise network of the type in which the invention may be practiced, it will be appreciated that the invention may be used in any variety of other computing environments, networked or otherwise.

Figure 2:
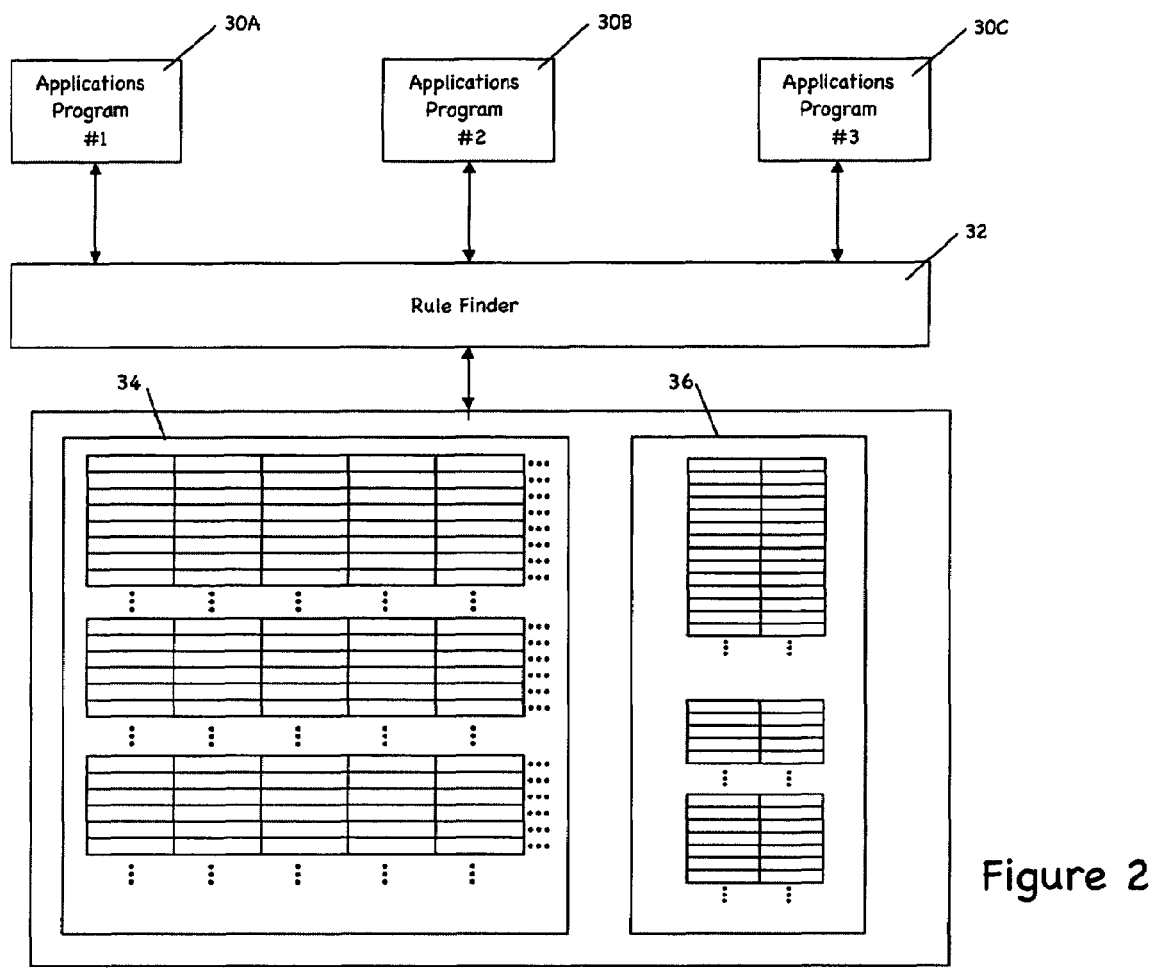
FIG. 2 depicts a rule finder that accesses a rules base and/or a translation table in accord with the invention.

FIG. 2 depicts a relationship between applications programs 30A-30C and a rule finder 32 that accesses rules base 34 and associated translation table(s) 36 in accord with the invention. The applications programs 30A-30C are conventional software programs operating on one or more of the digital data processors 10A-10C. These can be, for example, programs of the type used by customer service representatives to facilitate answering customer inquiries or setting up customer accounts. Alternatively, they can be of the type used in manufacturing industries to assist in formulating or carrying out production processes. More generally, applications programs 30A-30C represent software or other functionality that generate requests for rules specifying an objective and circumstance, or like constructs. Such requests can be in any conventional form, e.g., function calls, HTTP requests, and so forth.

Rule finder 32 responds to requests generated by the applications programs 30A-30C by accessing rules base 34 and/or translation table(s) 36 to determine rules corresponding to an objective/circumstance tuple specified in each such request. The rule finder 32 of the illustrated embodiment is implemented in software executing on one or more of the digital data processors 10A-10C, though in other embodiments it may comprise hardware, a combination of software and hardware, or otherwise, executing on one or more of those digital data processors or otherwise. Regardless, the rule finder 32 operates as discussed below (and elsewhere herein) and as illustrated, by way of non-limiting example in FIG. 5.

Rules base 34 is a store of rules indexed or otherwise accessible by objective and circumstance. Unlike the prior art, in which a rule-containing entry is typically provided for every likely combination of objective/circumstance expected in incoming requests, e.g., from applications programs 30A-30C, rules base 34 need not have entries for all expected circumstances. Rather, circumstances for some objective/circumstance tuples are addressed vis-à-vis translation table 36, as discussed below.

Though shown as tables in the figures for the sake of convenience, rules base 34 and translation table 36 of the illustrated embodiment may comprise tables, databases, linked lists, structs, or other data collections stored on and/or accessible by one or more of the digital data processors 10A-10C and, particularly, accessible by rule finder 32. Thus, by way of non-limiting example, the rules base may be contained in random access memory, read-only memory, CD ROM, DVD, hard disk, file servers, network addressable storage, or otherwise.

Figure 3:
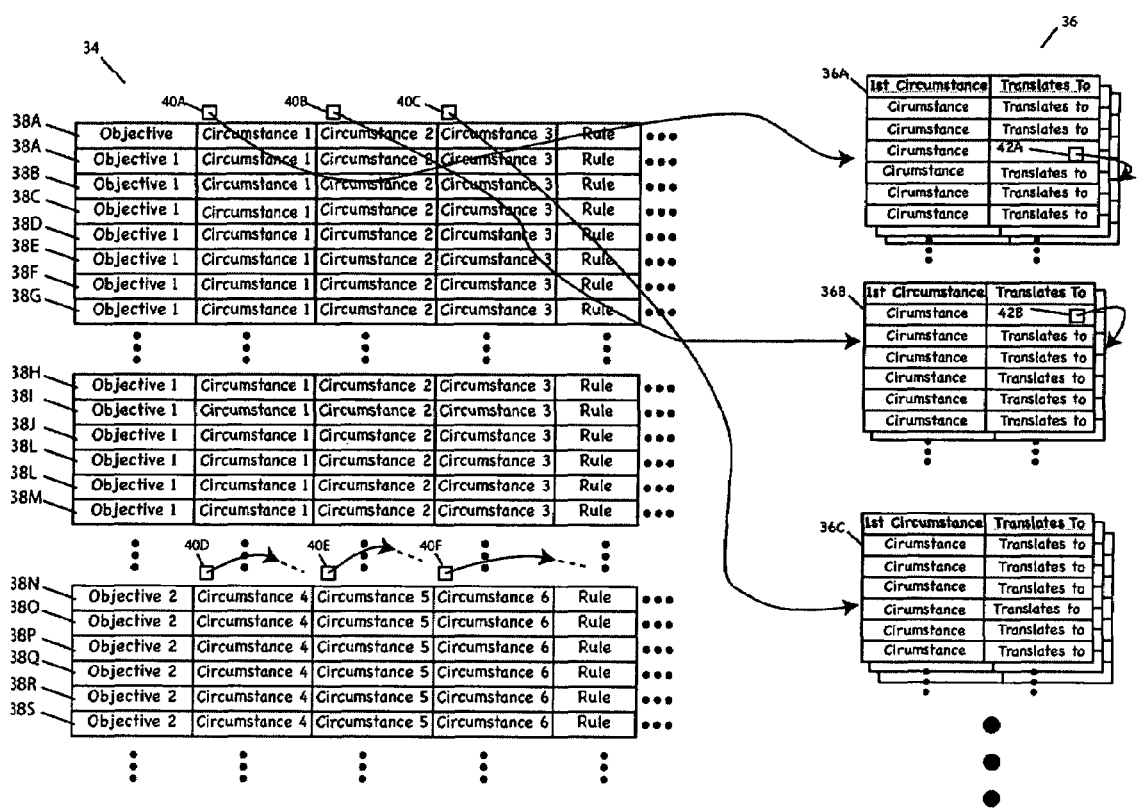
FIG. 3 illustrates a rules base and translation table of the type used in practice of the invention.

Referring to FIG. 3, the rules base 34 and translation tables 36 are shown in greater detail. Particularly, rules base 34 is shown as including a plurality of rule entries or records 38A-38S. Each record 38A-38S includes a rule that is associated with an objective, here, denoted "Objective x," and one or more (here, multiple) circumstances, each, denoted "Circumstance x," as shown in the drawing. Each record 38A-38S may include additional information, as well—such as additional rules, status and/or description fields of the type shown in FIGS. 3 and 6 (by way of example) and discussed in the corresponding text, of aforementioned U.S. Pat. No. 5,826, 250, the teachings of which are incorporated herein by reference. The rules, objectives, circumstances and other information maintained in the rules base entries may be stored directly in associated entries, records or other structs, or may be associated with them indirectly, e.g., by way of pointers or otherwise. For convenience, the objective and circumstance(s) designated in a request issued by the applications program 30A-30C, contained in the rule base entries, or so forth, are referred to herein as an objective/circumstance tuple.

Those skilled in the art will appreciate that, although, the entries for Objective 1 and Objective 2 are show with the same number of circumstances in the drawing, this is merely for convenience and is not a requirement of the invention.

As noted, translation tables 36 are used by rule finder 32 to facilitate finding rules for objective/circumstance tuples that are not listed in rules base 34—and, specifically, to find alternates to circumstances that are absent from the rules base. To this end, each translation table, e.g., 36A-36C, can include entries, each of which contains tuples of associated circumstances, where the first circumstance (for example) of each tuple is a circumstance that is expected in an incoming request, yet, may be absent from the rules base 34, and the second or other circumstances (again, for example) of each tuple is a circumstance that is found in the rules base 34 (or in another translation table entry). While the illustrated embodiment includes multiple translation tables, e.g., 36A-36C, in other embodiments only one such table may be provided and, in still other embodiments, more tables may be provided than are shown here. And, although tables are shown in the drawing, in other embodiments these may be databases, linked lists, structs or other data collections.

The rules base includes one or more identifiers 40A, 40B indicating which of the translation tables is to be used in translating circumstances specified in incoming requests. Thus, in the drawing, indicator 40A specifies that table 36A is to be used in translating unmatched circumstances of type Circumstance 1 in requests for rules associated with Objective 1; indicator 40B, unmatched circumstances of type Circumstance 2; and indicator 40C, unmatched circumstances of type Circumstance 3. A corresponding set of indicators 40D-40F are provided for the circumstances of Objective 2, though, as suggested by the drawing, those indicators need not specify the same tables as indicators 40A-40C. In embodiments having only one translation table, the aforementioned identifiers 40A-40F specify with which circumstances that table is to be used.

Similar identifiers can be used in entries of the translation tables, e.g., in place of (or in addition to) the map-to circumstance. Where used, these indicate that a further translation table is to be employed in determining an alternate circumstance for that specified in the request. These are depicted as pointers 42A, 42B associated with entries in the illustrated translation tables 36A, 36B.

Figure 4:
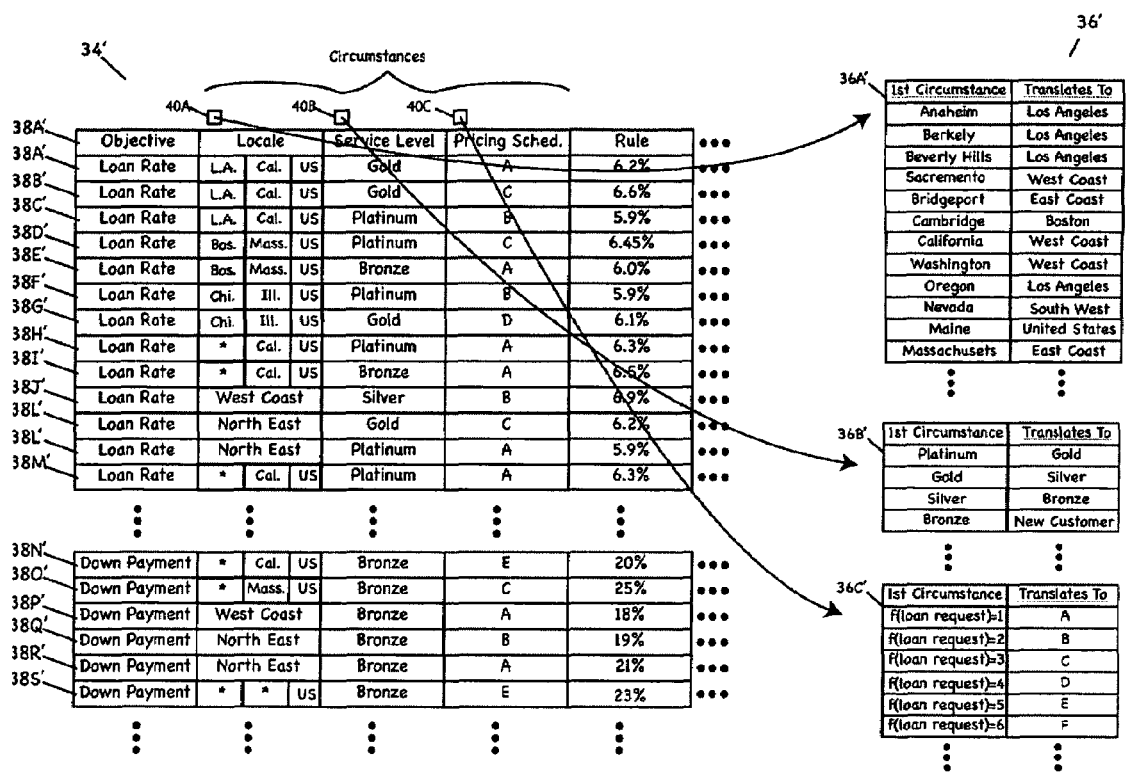
FIG. 4 illustrates one example of a rules base and translation table of the type shown in FIG. 3.

FIG. 4 illustrates one example of a rules base 34' and translation tables 36' adapted for returning rules related to loans, such as, for example home mortgages. Entries 38A'-38M' of rules base 34' pertain to the objective "Loan Rate" and various circumstances associated therewith, namely, customer locale, customer service level and pricing plan. For each objective/circumstance tuple, the entries of rules base 34' specify rules—in this case, loan rates. Likewise, entries 38N'-38S' pertain to the objective "Down Payment" and various circumstances associated with that objective (here, again, for convenience, locale, service level and pricing schedule), offering rules that specify percentage down payments. Of course, it will be appreciated that the substantive content of the rules base, as well as the number and type of objectives and circumstances, may vary in other embodiments.

As evident in the drawing, circumstances can be designated at varying levels of specificity within the rules base 34, e.g., as is the case with the locale circumstance. Thus, for example, entries such as 38A'-38E' (by way of example) include city, state and country designations. The rule finder 32 can match these entries with request tuples at city-level detail. On the other hand, entries such as 38H'-38I, include state and country designations only, leaving city "wildcarded" (as indicated by asterisks). The rule finder 32 can match these entries with request tuples at the state (and country) level, e.g., where no entries match at the city-level of detail. Further, entries such as 38S' include country designations only, leaving both city and state wildcarded. The rule finder can match these entries with request tuples at the country level, e.g., where no entries match at the city-level or state-level of detail.

Translation tables 36' contain lists of circumstances—e.g., locales, service levels and pricing schedules—that may be contained in rule requests received by the rule finder, e.g., from the applications programs 30A-30C, but that are not (or may not) be contained in the entries 38A'-38M' or 38N'-38S'. For each of these, the tables 36 list "translations" or mappings, i.e., circumstances that are expected in those entries or, alternatively, in other translation table entries. Thus, for example, translation table 36A' has entries for the circumstances (i.e., cities) Anaheim and Cambridge, which are not listed in rules base 34'. However, for each of those circumstances, the respective entries of translation table 36' list alternative circumstances, namely, Los Angeles and Boston, respectively. By way of further example, translation table 36C' has map-to entries specifying pricing schedule levels that are used in rules base 34' and that are derivable (e.g., by a function call) from loan amounts specified in the incoming requests.

Pointers or other identifiers 40A'-40C' identify tables 36A'-36C', respectively, for use in translating unmatched circumstances specified in incoming requests, as discussed above. Identifiers corresponding to 42A, 42B, of FIG. 3, are not shown in FIG. 4, although they could be used to provide cross-referencing between the illustrated tables 36A'-36C' and/or additional translation tables.

While translation tables 36A', 36B' are shown containing string (or text) designators, it will be appreciated that other data types, such as integers, reals, enumerations, and so forth, can be employed in the translation tables in accord with the form of the incoming requests and expected searches to be run against the rules base 34'.

Moreover, as evident from the discussion above, it will be appreciated that the translation tables can include function calls and other evaluatable expressions, e.g., as in the case of table 36C'. As shown here, that table includes function calls, $f$(loan request), which may be called with amounts specified in incoming requests in order to secure a match with entries of the corresponding circumstance, Pricing Schedule. In addition (or instead), the translation tables may include evaluatable expressions that involve, for illustrative purposes and by way of non-limiting example, (i) backward chaining and/or (ii) evaluation of other rules for the accessing of new data. As with translation table entries that include function calls, these expressions are executed or otherwise evaluated, e.g., by rule finder 32, in responding requests generated by the applications programs 30A-30C.

Operation

As will be evident to those skilled in the art, by using the translation tables 36' in combination with the rules base 34', the finder 32 can find rules for objective/circumstance tuples that are not encoded in the rules base. Thus, when the rule finder fails to find in the rules base 34' an entry with an objective and circumstance(s) specified in a request (e.g., from applications programs 30A-30C), the finder can search the translation tables 36' for an entry with a first circumstance matching that specified in the request—or, as in the case of table 36C, with a first circumstance that evaluates to "true" in view of the incoming request. The finder can then re-search the rules base using the corresponding circumstance from that entry, along with (i) the originally specified objective, and (ii) the other originally specified circumstances and/or map-to circumstances derived for them from the translations tables 26'. Once found, that rule can be returned to the requestor.

Figure 5:
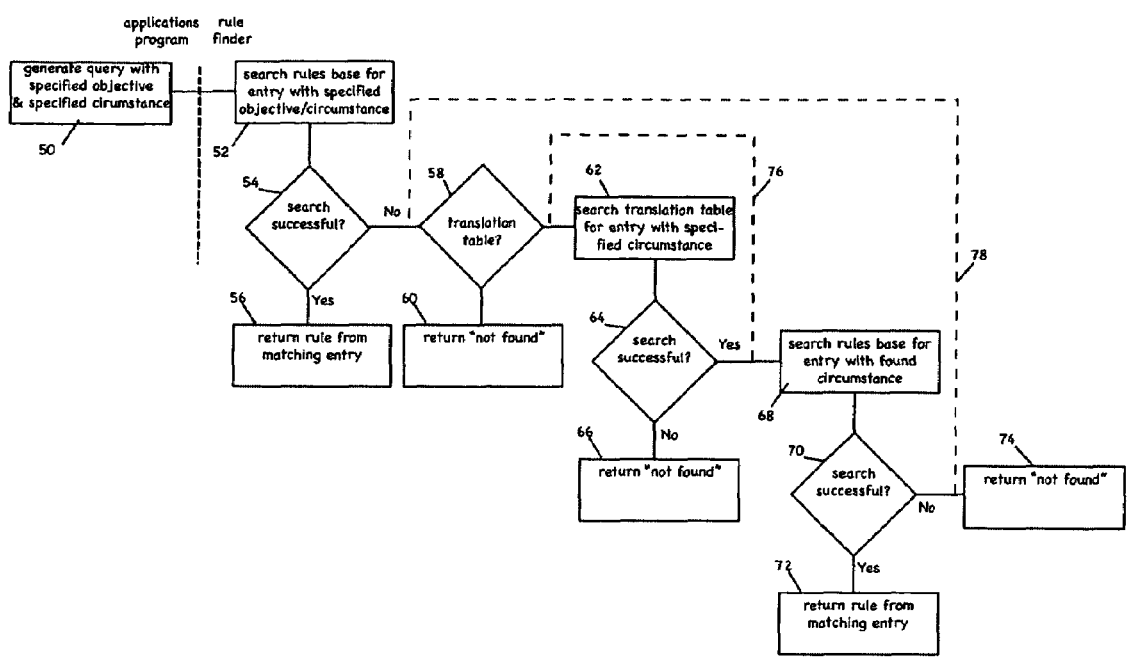
FIG. 5 depicts a method for identifying a rule for a specified objective and circumstance(s) according to one practice of the invention.
Figure 6:
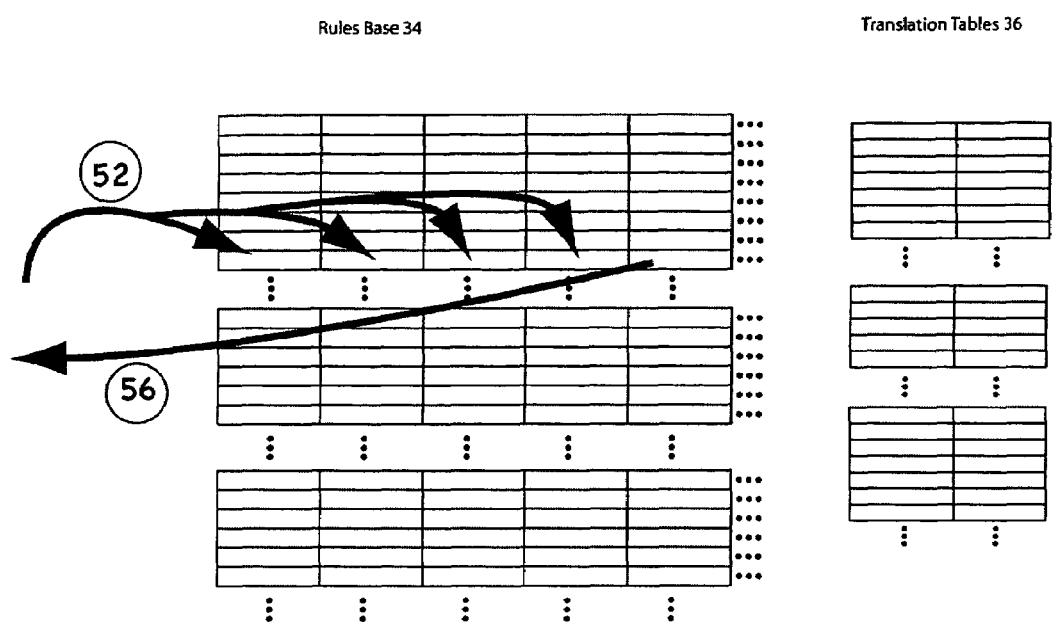
FIGS. 6 and 7 graphically depict the method of FIG. 5.
Figure 7:
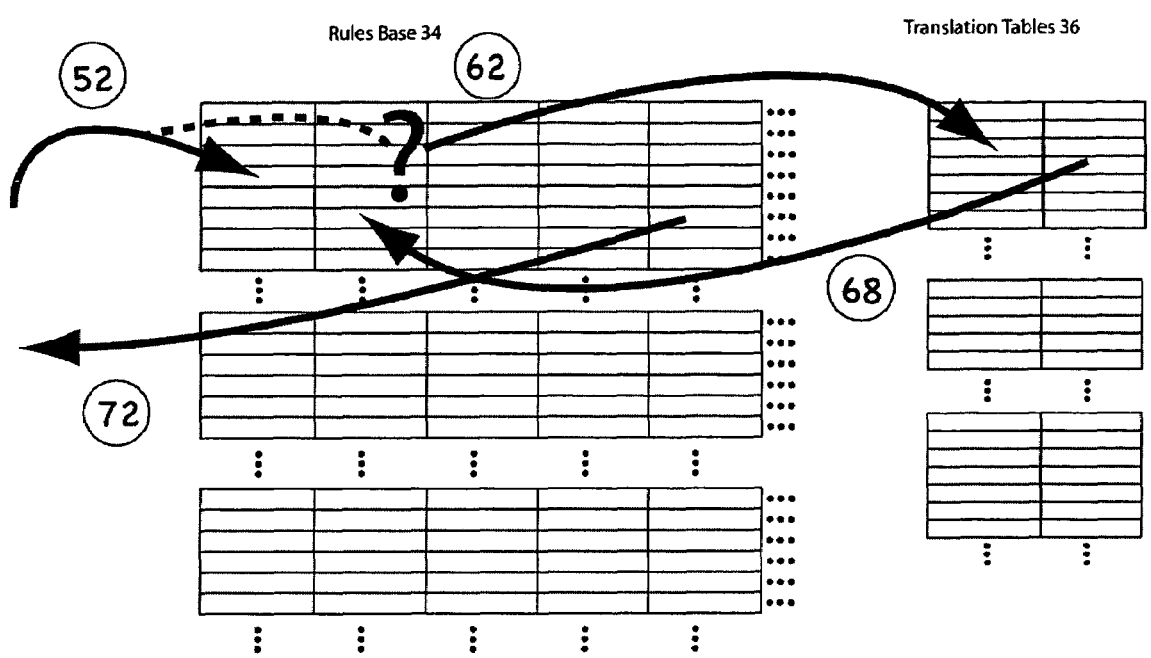

This can best be appreciated by reference to FIGS. 5-7. Specifically, FIG. 5 depicts a method for identifying a rule for specified objective and circumstances according to one practice of the invention. Referring to step 50 of that drawing, rule finder operation is invoked upon receipt of a query from an applications program, e.g., 30A. That query specifies inter alia an objective and multiple circumstances, here, locale, service level and loan request for which a rule is sought.

In step 52, the rule finder searches the rules base for a rule entry associated with an objective and circumstances matching those specified in the request. As evident from the discussion above, this includes matching the locale circumstance at the city-level and, failing that, at the state-level and country-levels, respectively—depending on the content of the wild-carded entries, if any, in the rules base. If the search is successful for locale, service level and pricing schedule, the rule finder returns to the requester the rule from that matching entry. See, steps 54-56.

If the search specified in step 54 is not successful, the rule finder inspects indicators 40A'-40F' to determine whether there is a translation table for the circumstance(s) that caused the failure. See, step 58. If not, the rule finder returns a message indicating that no rule was found. See, step 60.

Otherwise, in step 62, the rule finder searches the implicated translation table 36A'-36C' for a translation entry associated with a first circumstance matching the specified circumstance, or that evaluates to "true" in view of the incoming request content (which is also considered a "match") for purposes hereof. If such an entry is not found, the rule finder returns a message indicating that no rule was found. See, steps 64-66.

In step 68, the rule finder searches the rules base for a rule entry associated with an objective and circumstance matching the originally specified objective, the map-to circumstance associated with the translation table entry found in step 62, and the other originally specified circumstances (or translations thereof discerned from the translation tables). If the search is successful, the rule finder returns to the requester the rule from that matching entry. See, steps 70-72.

If the search of step 70 was not successful, the rule finder returns a message indicating that no rule was found. See, step 74. Except, however, in the event that multiple circumstance(s) failed to match in step 54, the rule finder repeats steps 58-70 for each combination of translated circumstances discerned from the translation tables, as shown by dashed line 78, prioritizing the searching sequence or among results, depending upon implementation requirements.

Referring back to step 68, if the matching translation table entry found in step 62 includes an identifier of a further translation table, the rule finder does not immediately search the rules base as shown in the flow chart. Rather, as shown by dashed line 76, it returns to the process illustrated at step 62, albeit searching that further translation table for an entry matching the specified circumstance—or, if the matching translation table entry includes a second circumstance (in addition to an identifier of a further translation table), an entry matching that second circumstance.

FIG. 6 graphically depicts the search for, and return of, a rule per steps 52-56, above, i.e., where the rules base contains an entry matching the specified objective/circumstance. FIG. 7 depicts the rule search per steps 52, 62, 68, and 72, where a translation table is used.

One skilled in the art will appreciate further features and advantages of the invention based on the above-described embodiments. Accordingly, the invention is not to be limited by what has been particularly shown and described herein. For example, it will be appreciated that rather than returning a rule matching a successful search in any of steps 56 and/or 72, above, the rule finder can return an indication of the success of the search, a location of an entry containing the rule, a value associated with the rule, or otherwise. In view hereof,

What is claimed is:

1. A method of finding a rule for a specified objective and circumstance, the method comprising the steps of:
   with a program executing on one or more digital data processors, generating a request for a rule associated with a specified objective and a specified circumstance,
   with a rule finder executing on one or more of the digital data processors, performing the steps of
   (A) responding to the request by searching a rules base accessible by one or more of the digital data processors for a rule entry having an associated objective matching the specified objective and having an associated circumstance matching the specified circumstance, where the rules base comprises a plurality of rule entries, each rule entry having associated therewith
      (i) a rule,
      (ii) an objective and a circumstance,
   (B) responding to a failed search in step (A) by searching a translation table accessible by one or more of the digital data processors for a translation entry having an associated first circumstance matching the specified circumstance, where the translation table comprises a plurality of translation entries, each translation entry having associated therewith a first circumstance and a second circumstance,
   (C) responding to a successful search in step (B) of the translation table by searching the rules base for a rule entry having an associated objective matching the specified objective and having an associated circumstance matching the second circumstance associated with the translation entry found by the successful search in step (B), and
   (D) returning to the program at least one of
      i) a rule from the rules base associated with the rule entry found by a successful search of the rules base performed in step (C),
      ii) a value associated with the rule from the rules base associated with the rule entry found by a successful search of the rules base performed in step (C),
      iii) a location of the rule from the rules base associated with the rule entry found by a successful search of the rules base performed in step (C), or
      iv) an indication of the success of the search of the rules base performed in step (C).

2. The method of claim 1, further comprising the step of responding to a successful search of the rules base performed in step (A) by returning to the program at least one of
   i) a rule from the rules base associated with the rule entry found by that search of the rules base performed in step (A),
   ii) a value associated with the rule from the rules base associated with the rule entry found by that search of the rules base performed in step (A),
   iii) a location of the rule from the rules base associated with the rule entry found by that search of the rules base performed in step (A), or
   iv) an indication of the success of that search of the rules base performed in step (A).

3. The method of claim 1, wherein step (B) includes evaluating an expression specified in a translation table entry.

4. The method of claim 1, wherein step (B) includes evaluating a function specified as a first circumstance of a translation table entry.

5. A method of finding a rule for a specified objective and one or more specified circumstances, the method comprising the steps of:

with a program executing on one or more digital data processors, generating a request for a rule associated with a specified objective and one or more specified circumstances, with a rule finder executing on one or more of the digital data processors, performing the steps of (A) responding to the request by searching a rules base accessible by one or more of the digital data processors for a rule entry having an associated objective matching the specified objective and having associated circumstances matching the one or more specified circumstances, where the rules base comprises a plurality of rule entries, each rule entry having associated therewith
  (i) a rule,
  (ii) an objective and one or more circumstances, (B) responding to a failed search in step (A) by searching a translation table accessible by one or more of the digital data processors for a translation entry having an associated first circumstance matching one of the one or more specified circumstances, where the translation table comprises a plurality of translation entries, each translation entry having associated therewith a first circumstance and a second circumstance, (C) responding to a successful search in step (B) of the translation table by searching the rules base for a rule entry having an associated objective matching the specified objective, having an associated circumstance matching the second circumstance associated with the translation entry found by the successful search in step (B), and having zero, one or more other associated circumstances matching one or more circumstances specified in the request or discerned from translation entries corresponding thereto, and (D) returning to the program at least one of
  i) a rule from the rules base associated with the rule entry found by a successful search of the rules base performed in step (C),
  ii) a value associated with the rule from the rules base associated with the rule entry found by a successful search of the rules base performed in step (C),
  iii) a location of the rule from the rules base associated with the rule entry found by a successful search of the rules base performed in step (C), or
  iv) an indication of the success of the search of the rules base performed in step (C).

6. A method of finding a rule for a specified objective and circumstance, the method comprising the steps of:

with a program executing on one or more digital data processors, generating a request for a rule associated with a specified objective and a specified circumstance, with a rule finder executing on one or more of the digital data processors, performing the steps of (A) responding to the request by searching a rules base accessible by one or more of the digital data processors for a rule entry having an associated objective matching the specified objective and having an associated circumstance matching the specified circumstance, where the rules base comprises a plurality of rule entries, each rule entry having associated therewith
  (i) a rule,
  (ii) an objective and a circumstance, (B) responding to a failed search in step (A) by searching a first translation table accessible by one or more of the digital data processors for a translation entry having an associated first circumstance matching the specified circumstance, where the first translation table comprises a plurality of translation entries, one or more of which translation entries have associated therewith a first circumstance and an identifier of a second translation table accessible by one or more of the digital data processors, (C) responding to a successful search in step (B) by searching the second translation table for a translation entry having an associated first circumstance matching the specified circumstance, where the second translation table comprises a plurality of translation entries, one or more of which translation entries have associated therewith a first circumstance and a second circumstance, (D) responding to a successful search in step (C) of the second translation table by searching the rules base for a rule entry having an associated objective matching the specified objective and having an associated circumstance matching the second circumstance associated with the translation entry found by the successful search in step (C), and (E) returning to the program at least one of
  i) a rule from the rules base associated with the rule entry found by a successful search of the rules base performed in step (D),
  ii) a value associated with the rule from the rules base associated with the rule entry found by a successful search of the rules base performed in step (D),
  iii) a location of the rule from the rules base associated with the rule entry found by a successful search of the rules base performed in step (D), or
  iv) an indication of the success of the search of the rules base performed in step (D).

7. The method of claim 6, further comprising the step of responding to a successful search of the rules base performed in step (A) by returning to the program at least one of
  i) a rule from the rules base associated with the rule entry found by that search of the rules base performed in step (A),
  ii) a value associated with the rule from the rules base associated with the rule entry found by that search of the rules base performed in step (A),
  iii) a location of the rule from the rules base associated with the rule entry found by that search of the rules base performed in step (A), or
  iv) an indication of the success of that search of the rules base performed in step (A).

8. The method of claim 6, wherein the first translation table comprises, in addition to one or more translation entries having associated therewith a first circumstance and an identifier of the second translation table, one or more translation entries having associated therewith a first circumstance and a second circumstance.

9. The method of claim 8, wherein the step (C) includes responding to a successful search of the first translation table performed in step (B) by searching the rules base for a rule entry having an associated objective matching the specified objective and having an associated circumstance matching the second circumstance associated with the translation entry found by the successful search of the first translation table performed in step (B).

10. The method of claim 9, further comprising the step of responding to a successful search of the rules base performed in step (C) by returning to the program at least one of
   i) a rule from the rules base associated with the rule entry found by that search of the rules base performed in step (C),
   ii) a value associated with the rule from the rules base associated with the rule entry found by that search of the rules base performed in step (C),
   iii) a location of the rule from the rules base associated with the rule entry found by that search of the rules base performed in step (C), or
   iv) an indication of the success of that search of the rules base performed in step (C).

11. The method of claim 9, wherein any of steps (B) and (C) include evaluating an expression specified in a translation table entry.

12. The method of claim 9, wherein any of steps (B) and (C) include evaluating a function specified as a first circumstance of a translation table entry.

13. The method of claim 1, wherein step (B) includes executing an expression specified in a translation table entry, which expression specifies any of backward chaining and/or evaluation of rules from the rules base for the accessing of new data.

14. The method of claim 9, wherein any of steps (B) and (C) include executing an expression specified in a translation table entry, which expression specifies any of backward chaining and/or evaluation of rules from the rules base for the accessing of new data.

15. The method of claim 5, further comprising the step of responding to a successful search of the rules base performed in step (A) by returning to the program at least one of
   i) a rule from the rules base associated with the rule entry found by that search of the rules base performed in step (A),
   ii) a value associated with the rule from the rules base associated with the rule entry found by that search of the rules base performed in step (A),
   iii) a location of the rule from the rules base associated with the rule entry found by that search of the rules base performed in step (A), or
   iv) an indication of the success of that search of the rules base performed in step (A).

16. A method of finding a rule for a specified objective and one or more specified circumstances, the method comprising the steps of:
   with a program executing on one or more of digital data processors, generating a request for a rule associated with a specified objective and one or more specified circumstances,
   with a rule finder executing on one or more of the digital data processors, performing the steps of
   (A) responding to the request by searching a rules base accessible by one or more of the digital data processors for a rule entry having an associated objective matching the specified objective and having associated circumstances matching the one or more specified circumstances, where the rules base comprises a plurality of rule entries, each rule entry having associated therewith
      (i) a rule,
      (ii) an objective and one or more circumstances,
   (B) responding to a failed search in step (A) by searching a first translation table accessible by one or more of the digital data processors for a translation entry having an associated first circumstance matching one of the one or more specified circumstances, where the translation table comprises a plurality of translation entries, one or more of which translation entries have associated therewith a first circumstance and an identifier of a second translation table accessible by one or more of the digital data processors,
   (C) responding to a successful search in step (B) by searching the second translation table for a translation entry having an associated first circumstance matching one of the one or more specified circumstances, where the second translation table comprises a plurality of translation entries, one or more of which translation entries have associated therewith a first circumstance and a second circumstance,
   (D) responding to a successful search in step (C) of the second translation table by searching the rules base for a rule entry having an associated objective matching the specified objective and having an associated circumstance matching the second circumstance associated with the translation entry found by the successful search in step (C), and having zero, one or more other associated circumstances matching one or more circumstances specified in the request or discerned from translation entries corresponding thereto, and
   (E) returning to the program at least one of
      i) a rule from the rules base associated with the rule entry found by a successful search of the rules base performed in step (D),
      ii) a value associated with the rule from the rules base associated with the rule entry found by a successful search of the rules base performed in step (D),
      iii) a location of the rule from the rules base associated with the rule entry found by a successful search of the rules base performed in step (D), or
      iv) an indication of the success of the search of the rules base performed in step (D).

17. The method of claim 16, further comprising the step of responding to a successful search of the rules base performed in step (A) by returning to the program at least one of
   i) a rule from the rules base associated with the rule entry found by that search of the rules base performed in step (A),
   ii) a value associated with the rule from the rules base associated with the rule entry found by that search of the rules base performed in step (A),
   iii) a location of the rule from the rules base associated with the rule entry found by that search of the rules base performed in step (A), or
   iv) an indication of the success of that search of the rules base performed in step (A).

18. The method of claim 16, wherein the first translation table comprises, in addition to one or more translation entries having associated therewith a first circumstance and an identifier of the second translation table, one or more translation entries having associated therewith a first circumstance and a second circumstance.

19. The method of claim 18, wherein the step (C) includes responding to a successful search of the first translation table performed in step (B) by searching the rules base for a rule entry having an associated objective matching the specified objective and having an associated circumstance matching the second circumstance associated with the translation entry found by that successful search performed in step (B), and having zero, one or more other associated circumstances matching one or more circumstances specified in the request or discerned from translation entries corresponding thereto.

20. The method of claim 19, further comprising the step of responding to a successful search of the rules base performed in step (C) by returning to the program at least one of
   i) a rule from the rules base associated with the rule entry found by that search of the rules base performed in step (C),
   ii) a value associated with the rule from the rules base associated with the rule entry found by that search of the rules base performed in step (C),
   iii) a location of the rule from the rules base associated with the rule entry found by that search of the rules base performed in step (C), or
   iv) an indication of the success of that search of the rules base performed in step (C).

21. The method of claim 19, wherein any of steps (B) and (C) include evaluating an expression specified in a translation table entry.

22. The method of claim 19, wherein any of steps (B) and (C) include evaluating a function specified as a first circumstance of a translation table entry.

23. The method of claim 19, wherein any of steps (B) and (C) include executing an expression specified in a translation table entry, which expression specifies any of backward chaining and/or evaluation of rules for the accessing of new data.

* * * * *

UNITED STATES PATENT AND TRADEMARK OFFICE
CERTIFICATE OF CORRECTION

PATENT NO. : 7,640,222 B2
APPLICATION NO. : 11/368360
DATED : December 29, 2009
INVENTOR(S) : Alan Trefler Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 255 days.

Signed and Sealed this

Ninth Day of November, 2010

David J. Kappos
*Director of the United States Patent and Trademark Office*